Inventor:
Julius Lohse,
By Watson Coleman.

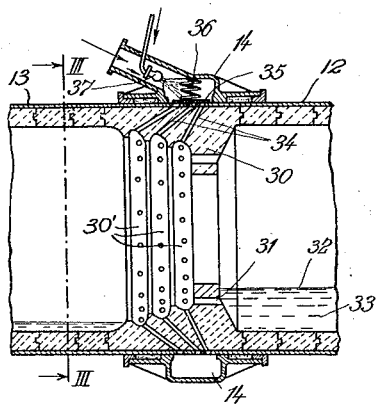
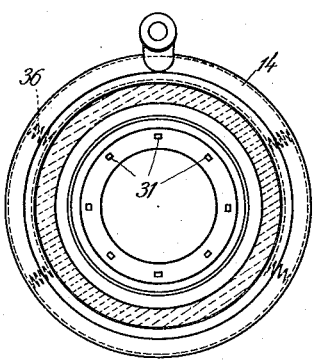
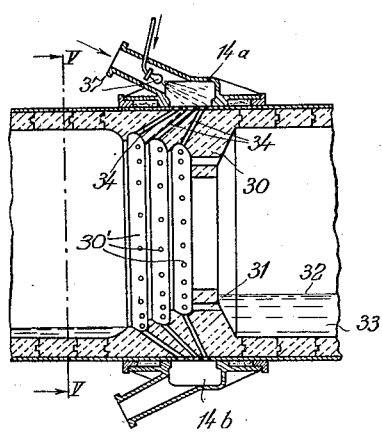
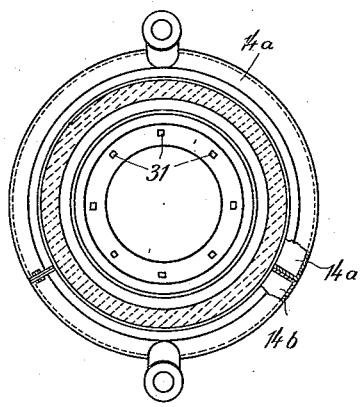

Patented Dec. 3, 1940

2,223,569

UNITED STATES PATENT OFFICE 2,223,569

PROCESS AND APPARATUS FOR THE DIRECT RECOVERY OF HEAVY METALS OF THE NONFERROUS GROUP FROM ORES AND OTHER PRIMARY MATERIALS

Julius Lohse, Berlin, Germany

Application December 28, 1937, Serial No. 182,110 In Germany August 17, 1931

10 Claims. (Cl. 266—9)

Owing to the increasing requirements for copper and other metals a demand of such proportions has arisen not only in Germany but also on the entire world market that even lean copper and other ores require to be utilised, in consequence of which chemical-metallurgical processes have been perfected accordingly. Even the perfected water-jacketed shaft furnace and the long large-hearth reverberatory furnace have not been able to keep pace with this demand for the smelting of lean ores and flotation concentrates, so that despite suitable development of chemical-metallurgical processes it has not been possible to reduce the treatment costs of the latter owing to the lack of correspondingly developed, cheaply working furnaces.

It is the object of the invention to devise a process and a furnace for converting the same to practice, in which the modern chemical-metallurgical processes can be made use of with maximum utilisation of the heat and in continuous operation in the treatment of the metal from the crude ore stage up to the finished metal.

In employing flotation and other more recently developed processes in conjunction with hearth furnaces, the latter exhibit considerable weaknesses both in the matter of maintenance as well as in the operation and charging. The starting up alone of a large reverberatory furnace of this nature is a tedious operation. Owing to the expansion and shrinkage occurring when the furnace is frequently set into and out of operation the life of the furnace is considerably shortened. The fettling, insulating, heating and maintenance of the large flat arch, etc., require considerable technical skill and much time and money in keeping up the production to the desired level.

The tapping of the copper matte is not without danger, and the removal of the slag imposes a heavy burden on the workmen. Moreover, with the provision of separate furnaces for each operation usual at the present time, there are the difficulties which attend conveyance of the copper matte in ladles and the transfer thereof by means of electric cranes into the basic converter, and also the difficulties associated with adaptation of the temperature of the matte to the requisite temperature of the charge in the converter.

In also taking into consideration that the carrying out in basic converters of the Manhès blast process, despite the extent to which this has been scientifically developed and perfected, is an expensive and delicate operation, and further that the rendering innocuous, as required by law, of the converter gases containing sulphurous acid, or the difficulty in utilising these gases, has always been a weak point attendant on these plants, it will be recognised that owing to the more recent separation into intermittently operating furnaces the metal trade of to-day is faced with installation costs which place a considerable burden on the price of the finished product.

The present invention accordingly sets forth a process and a furnace for reducing the same to practice, in which the heavy metals of the nonferrous group can be produced from the ores or other raw materials in a series of operations following immediately one upon the other, care being taken that an unnecessary dissipation of heat upon the transfer of the charge from one thermal treatment to another is avoided by immediately adjoining furnaces, whilst a troublesome and dangerous conveyance of the charge from one furnace to the other, an unnecessary cooling of the charge when taken from the one furnace and the detrimental effect of poisonous gases on the workmen are eliminated.

It is, for example, the object of the invention to perform, in a series of operations following immediately one upon the other, the preliminary roasting in direct flow with the heating flame, and the final roasting, the smelting and the refining in counter-flow to a second throughgoing heating, the waste gases of the two heating currents meeting in the passage from preliminary roasting to final roasting being conducted to a common furnace head for further use. To be able to utilise lean ores the latter, finely disintegrated, are discharged in common with the roasting agent in a state of suspension into a powerfully whirling flame current in the roasting chamber, the waste gases being withdrawn from the furnace whilst this flame current is maintained. The gases sucked off, assuming the roasting has not been fully completed on the first occasion, can again be introduced if necessary in common with the particles of ore floating into the gas current into the roasting chamber where, mixed with fresh oxidizing air, they meet, in accordance with the invention, against the long roasting flame initially projected into the roasting chamber, so that this roasting flame develops in corona-like fashion into a hollow cone of flame, in the core of which, owing to the supply of oxygen and the heat liberated, a second zone of ignition is produced, which permits of a final dead roasting to an extent which has not been reached by any method of treatment heretofore.

According to the invention, the deposit from this flame reaction is sucked up anew in the form of dust suspended in the flame gases and is filtered off, and from this filter is conducted in direct fashion in counter-flow to final treatment in a new flame, whilst at the same time the coarser roasted material deposited as a result of the preliminary roasting in the form of small lumps is conveyed mechanically out of the furnace by rotary motion and passed in direct fashion to the charging point of the final smelting furnaces. In the final smelting the small lumps and the dust arriving in hot condition from the roasting process are passed through immediately connected rotary furnaces, in which the hot charge after traversing a final roasting zone in half-molten condition is conducted into collecting smelting furnace, from there into a converter, and from the latter, immediately following thereon, into the refining chamber, in continuous operation by rotary movement of the furnace system and in counter-flow to a powerfully whirling heating flame blown through the entire furnace system from the refining chamber. To permit of the passage of this single heating flame, which is certainly forced under high pressure in the direction of the chamber axes, the flame current is sucked up by a blower at the end of the furnace system, in which connection there can be interposed a heat exchange system. Exactly in the same manner as in the preliminary roasting the flame current of the blower burner with the particles suspended therein can be sucked up and again conducted to the roasting chamber, the flame gases sucked up in the final smelting of the metals together with the particles contained therein can be blown in similar fashion to the roasting flame of the preliminary roasting stage, with absolute control of the roast.

Otherwise the waste gases from the final smelting are filtered by a dust filter in common with the waste gases from the preliminary roasting process, and the cleaned gases are conducted in the known fashion to a sulphuric acid manufacturing system.

The particular advantage of the process and the furnace system according to the invention consists in the fact that commencing with the projection of the ores in pulverulent form into the roasting chamber in common with the roasting flame up to the finally refined metal every operation by hand is precluded, and that the dressing and smelting of the ore can be carried out in continuous operation, so that any deterioration of the material of the furnace under varying thermal load is avoided, the entire furnace system maintaining a constant temperature. The additional advantage and the success achieved by the system according to the invention are accordingly based on the fact that owing to the proposed preliminary roasting there is no longer supplied to the final roasting, the smelting, the converting and refining a half-finished product such as that represented by the copper matte usually conducted to the final smelting process. Despite the use of lean ores a concentrated product of such nature is supplied to the final smelting process that assuming the metal being treated is copper, this product may be regarded as blue stone and white metal. In consequence the converter employed for blistering purposes need merely be of short length. The usual converters employed in intermittent processes have a length of roughly 9 metres, whereas in the invention a converter of merely 1 metre in length is required for converting the copper from the smelting process.

In similar fashion the complete design of a copper furnace plant of this nature takes on a much smaller size owing to its continuous operation in relation to its daily output, so that the installation costs are also unusually small in comparison with the capacity of production.

An additional advantage associated with the invention consists in the fact that there is no intermittent transfer of the charge from one furnace to another (no matte ladles, no cranes are necessary, no ladle crusts require to be resmelted, no dust to be briquetted, sintered on Dwight Lloyd bands, no converter shell heating between charge changing, no breakdowns by hearth brick side walls arch defects or the like). The air inhaled by the workers in charge is not rendered poisonous by harmful gases, whilst moreover, owing to the continuous nature of the production, the waste gases contain a constant high percentage of sulphur oxide and sulphur dioxide, which after filtering can be conducted free from dust to a sulphuric acid manufacturing plant, which then operates with less disadvantages than one which is fed by furnace and converting plant systems supplying waste gases intermittently, sometimes with concentrated and sometimes with weaker sulphurous acid mixed with air sucked in through numerous charging doors, hoods or the like.

The invention is illustrated by way of example in the accompanying drawings, in which Fig. 1 shows in longitudinal section a furnace system according to the invention.

Fig. 2 shows the partition between the settler and the converter.

Fig. 3 is a section on the line 3—3 of Fig. 2.

Figs. 4 and 5 show another variation of the bustle pipe arrangement in several views.

Figure 1:
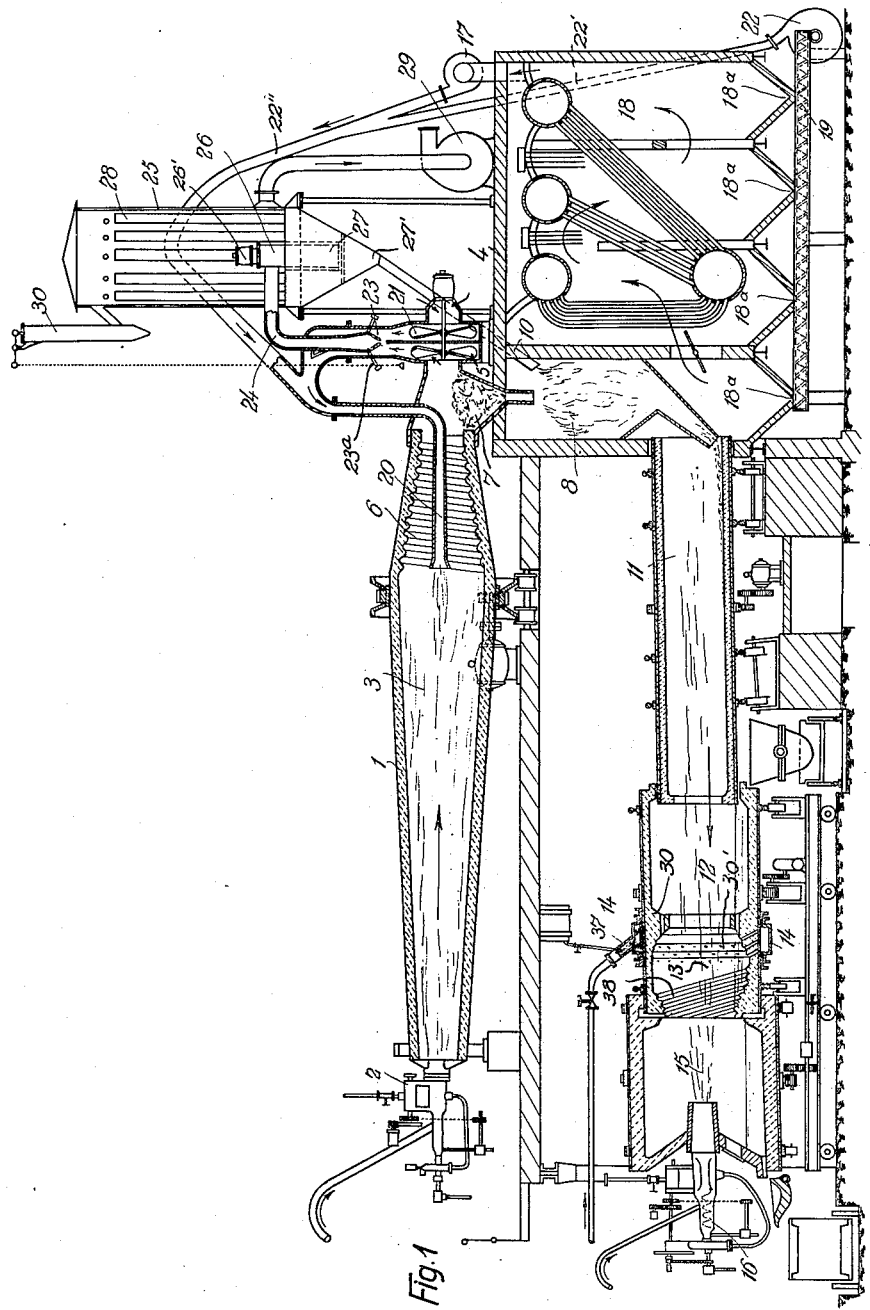

In Fig. 1, 1 is the dressing drum with the roasting chamber 3, into which there is projected in a long whirling flame by the dust burner 2 a mixture of finely commingled ore, coal dust or other fuels together with compressed air and roasting additions.

This burner 2 is preferably so designed that a certain ratio is always maintained automatically between the single parts of the mixture, so that it is merely necessary to adjust the amount of the charge. In this way there is supplied to the preliminary roasting process in perfectly uniform manner and under absolute control during the entire operation, a mixture which has been determined beforehand by experiment in the laboratory. The rotary shaft furnace containing the roasting chamber 3 is designed as a double-cone furnace and has formed in its lining, at the outlet end, the helical grooves 6, which by reason of the rotary movement of the rotary shaft furnace conduct the lumps and coarser particles of roasted material deposited by the flame to the receiver 7, from where they fall into the collecting bunker 8 of the furnace head 4. The smaller particles of dust which are suspended in the flame during the roasting operation and are maintained in this state of suspension by the fan 5, can be returned, as may be desired by the manipulation of the control valve mechanism generally indicated by the numeral 23, by way of the pipe 20 to be discharged back into the roasting chamber in opposition to the first flame. Any suitable means may be made use of for closing the pipe 24, hereinafter more specifically referred to, to cause the blower to drive the dust into the pipe 20, the means here shown consisting of a pair of doors 23a suitably supported with respect to the pipe 24 to close the latter for this purpose. For this purpose the pipe 20 of refractory material projects centrally into the roasting chamber 3 at the discharge end thereof.

According to the invention, both the suction fan 5 as well as the pressure blower 21 for the addition of fresh air are arranged on a common driven shaft for the purpose of avoiding unnecessary transverse pipe connections. By manipulating the valve doors 23a, the fans may be employed to draw dust from the roasting chamber and drive it back through the pipe 20 together with fresh air drawn in by fan 21, or the fan 5 may operate, after the positions of the valve doors have been changed, to withdraw the dust and blow it through the pipe 24. While both fans are on the same shaft to operate together, it will be obvious that by manipulating the doors 23a, the flow of gases effected by the fan 5 and of the fresh air effected by the fan 21 may be controlled to pass either into the pipe 20 or the pipe 24. Owing to this return of the waste gases and dust in opposition to the main roasting flame the flame is inflated in corona-like fashion, forming a new core. Obviously since the flame is inflated by the returning current of gases, such currrent must be at a pressure in excess of that by which the flame is produced. In this core the roasting is so extensive that the gases and dust sucked off by the blower 5 can be passed direct to the dust filter tower 25 hereinafter described, from which the dust, through the pipe 10, likewise falls into the bunker 8. The desulfuring effect of roasting the dust and lumps in the preliminary roasting chamber of the present invention is more extensive than in the vertical shaft roasting furnaces as now used wherein agitation is effected by rabbling.

From the bunker 8, which offers a certain gas seal against passage of the gases of the final smelting back through receiver 7, the contents are conducted in hot condition to a furnace system comprising a plurality of furnaces, which interengage telescopically or in stuffing-box fashion and each of which is preferably furnished with a separate drive and is capable of being moved out separately for the purpose of repairs and overhauling. This furnace system comprises the final roasting and preheating chamber 11, the settler 12, the converter 13 and the refining drum 15, and is heated by the burner 16 with a long flame directed in opposition to direction of movement of the charge. This burner is such that by means of the same a mixture of liquid and solid fuels, the latter in pulverulent form, together with additions of a desired kind can be projected in a long flame into the refining drum 15.

The flame passes along the axis of the complete system through all chambers of the rotary furnaces and is maintained by a suction draught which is produced by the blower 17 with the interposition of a heat-exchange system 18. In the final roasting and preheating chamber the charge supplied in the hot state is finally roasted and preliminarily fused, and in this preliminarily fused condition passes into the settler 12, where the slag is separated from the metal.

The partition between the settler 12 and the converter 13 is so designed that at the point of separation between the two chambers there is provided in the lining of the furnace an inwardly directed annular collar 30, which possesses towards the settler a steep face causing the accumulation of material within the settler, but towards the converter chamber is inclined in terrace-like form and is formed to provide the series of annular troughs or channels 30'. In this construction there are provided in the collar somewhat below the inner edge thereof passages 31, which are so disposed that the slag 32 floating on the material is prevented from running off, whilst the molten material 33 is able to pass through the passage 31 to the converter chamber by way of the terraces. In flowing down by way of the troughs or channels 30' the molten material also flows over the orifices of tuyères 34 which open through the bottom of the troughs, through which there is forced a current of air by means of an air compressor for the purpose of aerating the molten material. For this purpose there is provided a nonrotating bustle pipe or annular manifold 14 having two stuffing boxes on each side and a pipe connection for the introduction of air. Inside the bustle pipe there are provided a thin steel band 35 and bolts and springs 36 for pressing the said steel band against the outer side of the steel shell of the furnace drum.

The band covers three-quarters of the circumference to seal off the upper tuyères 34 against the admission of air, so that only those tuyères which are situated below the metal bath are open to pass blowing air through the molten material flowing down by way of the said trough-like terraces.

In this terrace-like aerating hearth there are removed the last impurities in the formed slag. The formed slag and blister copper pass from the converter by additional rotary movement by means of a helically grooved lining of the converter chamber 38 into the refining drum 15, where they can be separately tapped. In the refining drum there is a working door for the usual assaying, poling the bath, slag skimming and the like. This rich slag may be returned to hopper 8 for re-smelting. The discharge of the poor slag from the settler chamber 12 is so performed that the slag 32 retained by the collar 30 is capable of flowing off in the gap between the opening of the preheating drum 11 and the drum 12 and is received by slag trucks. The flame gases sucked up from the furnace system after the final smelting are separated by the labyrinth guide in the heat-exchange system 18 into particles of gas and dust in coarse form.

The particles of dust which are trapped in the heat exchange chamber 18 fall into the receiving bunkers 18a and are picked up by the conveying worm 19 by which they are conducted to the blower 22. These dust particles must be returned to the roaster 3 to be re-treated and they are mixed with air in the blower 22 and directed upwardly through the pipe line 22' to enter the pipe 22'' which leads back to the pipe 20 which discharges into the roasting chamber. This dust is mixed with waste gases drawn from the heat exchange chamber 18 by the blower 17.

In the filter tower 25 there is provided a centrifugal separator 26, 27, which is furnished with a coarse jacket screen and performs the coarse sifting.

The coarse particles withdrawn from the discharge end of the roasting chamber 3 by the fan 5 and driven upwardly into the separator through the pipe 24 enter a suitable rotary agitator and screen unit, generally indicated by the numeral 27, the agitator being operated by the electric motor 26' which is mounted upon the upper end of the unit, as shown. These particles are driven against the screen separator and fall downwardly into the receiver 27' while the dust and gases pass upwardly where separation is effected in the tower 25 by means of the dust bags 28, this tower being of gas-tight construction. The dust of the gases is retained in the bags and the gases pass through the bags, the heavier sulphur dioxide gas being drawn off through the lower part of the tower by means of the pump 29 for use in sulphuric acid manufactured while the lighter gases rise into the upper part of the tower and may be removed by means of the chimney 30 or in any other suitable manner. By shaking the filter bags when necessary, the trapped dust may be discharged therefrom downwardly into the receiver 27' to pass into the hopper 8.

The single furnace drums of the complete system are each electrically driven by separate motor drives, and it will be quite apparent that each drum can be regulated at will by the operator.

In certain instances, dependent on the quantity of raw material, it may be necessary to make use of a more intense heating in the last refining stages. For this purpose, according to the invention, there is provided in the pipe connection for the introduction of air to the trough-like terraces between the converter and the settler drum a disintegrating tuyère 37 adapted to inject heavy oils, there being introduced, for example, a mixture of air and oil vapours.

Another variation shown in Figs. 4 and 5 divides the nonrotating bustle pipe 14 into two parts, the one of these 14a covering three-quarters of the upper circumference of the furnace drum for the introduction of a mixture of oil and air into the upper tuyères 34, the second part 14b of the divided bustle pipe being provided with a pipe connection for the introduction of blowing air into the tuyères below the metal bath.

By this method it is possible to prevent the formation of copper oxide in the copper bath, the copper oxide being immediately reduced to metallic copper owing to the pressure of C and H₂ formed by the cracking of $CH_4$ and $C_2H_4$ forming the oil injected with the air. On the upper side of the copper bath the said oil gases injected with the blowing air are caused to be ignited ($CO_2$, $H_2O$, CO being formed), so that a very high temperature is obtained at this point and it is quite impossible for the copper charge to be blown cold, such as occurs frequently in the processes at present in use.

The blown blister copper is discharged from the converter shell 13, for example by a helical firebrick lining 38, so that the blister copper is discharged continuously into the refining drum 15, which is sufficiently large to act as a container. Very little refining requires to be done at this stage, as the converter 13 has worked up the blister copper by treating it as a thin band whilst it is passing over the inclined terrace-like tuyère zone, so that all impurities are collected in a very liquid slag, passing with the blister copper to the refining drum.

The entire process described in the above is rendered possible by reason of the following:

There are four sources of heat to maintain the processes carried out continuously in 11, 12, 13 and 15, quite apart from the fact that the charge is already heated as a result of the primary roasting operation in 3.

The first source of heat is represented by the burner 16, which projects a long and powerfully whirling flame into the entire system of furnace drums.

The second source of heat is constituted by the burning of sulphur contained in the white and blue metal bath, pouring through the partition openings into the converter section, to be blown there instantly to blister copper.

The third source of heat is represented by the development of calories by combustion of the cracked oil gases injected with the blowing air into the bustle pipe 14 and the tuyère system.

Fourth source of heat: The large surfaces of the refining bath 15 with tons of liquid metallic copper and the revolving firebrick lining raised to temperature by the burner 16. The surplus of heat from the combustion of the sulphur and oil gases in the converter and the flame heat itself constitute the means by which the process in the drum 11 of practically dead roasting and rapid smelting of charge material rich in copper is rendered possible, so that no poor matte, but rich blue and white metal is formed.

The smelting of copper matte with its corrosive action in the poor state and its big loads of slag is dispensed with in view of the proposal to perform rapid and intense preliminary roasting in the oxidizing conical flame zone of the roasting furnace 3 and by utilization of the eminent heat sources in the combined rotary furnace drums, which are telescopically connected one to the other, whereby the process can be carried out in continuous operation and the flow of the molten material can be regulated in each section.

It will be understood that numerous modifications are quite possible, particularly as regards the roasting drums, without departing from the spirit of the invention.

What I claim as new and desire to secure by Letters Patent is:

1. A process for the direct recovery of heavy metals of the nonferrous group from ores and other primary materials, which consists in performing in a series of operations following immediately one upon the other the preliminary roasting in direct flow with the heating and the final roasting, the smelting and the refining in counterflow to the heating, the waste gases of the two heating currents meeting in the passage from preliminary roasting to final roasting being conducted to a common furnace head for further use.

2. An apparatus for the direct recovery of heavy metals of the nonferrous group from ores and other primary materials, comprising a double conical rotary shaft furnace into one end of which the ore is introduced, a burner at said end arranged to direct a flame longitudinally through the furnace, an ore receiver at the other end of the furnace, said furnace at the said other end being interiorly formed to effect longitudinal movement of the ore through said end into the receiver by rotation of the furnace, a rotary shaft furnace system disposed parallel to said furnace and comprising a plurality of rotary drum furnaces having their ends in interengaging telescoping relation, said drums being independently rotatable and comprising a final roasting drum, a settler, a converter and a refining drum, means for conducting ore from said receiver directly into said final roasting drum, and means for directing a flame from within the refining drum longitudinally through the drums.

3. An apparatus for the direct recovery of heavy metals of the nonferrous group from ores and other primary materials, comprising a double conical rotary shaft furnace into one end of which the ore is introduced, a burner at said end arranged to direct a flame longitudinally through the furnace, an ore receiver at the other end of the furnace, said furnace at the said other end being interiorly formed to effect longitudinal movement of the ore through said end into the receiver by rotation of the furnace, a rotary shaft furnace system disposed parallel to the said furnace and comprising a plurality of rotary drum furnaces having their ends in interengaging telescoping relation, said drums being independently rotatable and comprising a final roasting drum, a settler, a converter and a refining drum, means for conducting ore from said receiver directly into said final roasting drum, means for directing a flame from within the refining drum longitudinally through the drums, fan means for drawing off dust and gases from said first furnace through the ore receiver, and means for returning the dust to the said first furnace and discharging it longitudinally therein in opposition to the burner flame.

4. Apparatus for the direct recovery of heavy metals of the nonferrous group from ores and other primary materials, comprising a double conical rotary shaft furnace, means for directing a flame longitudinally through the furnace from one end, an ore receiver at the other end of the furnace, helical grooves formed in the inner wall of the furnace at said other end to effect movement of the ore into the receiver by rotation of the furnace, a chamber, a hopper within said chamber arranged to receive ore from said receiver, a plurality of rotary shaft furnace drums having their ends in interengaging telescopic relation and constituting a final roasting drum, settler drum, converter and refining drum, means for independently rotating said drums, said hopper discharging into said final roasting drum and said last drum opening into said chamber for the discharge of gases and dust thereinto, a burner in said refining drum and directed longitudinally thereof through the other drums toward said chamber, and means for removing dust and gases from said chamber and discharging the same back into said rotary furnace in a direction opposed to the flame of the burner.

5. An apparatus for the direct recovery of heavy metals of the nonferrous group from ores and other primary materials, comprising a rotary shaft furnace, means for discharging a flame longitudinally through the furnace from one end, the other end of the furnace constituting an outlet, an ore receiver at said outlet, a rotary final roasting drum, a drum rotatably mounted adjacent one end of and receiving the end of the final roasting drum, a refining drum receiving in one end an end of the second-mentioned drum, the said final roasting drum receiving in its other end ore from said receiver, said second-mentioned drum having an interior wall flange presenting a steep face upon the side adjacent the final roasting drum and a gradually sloping face upon the opposite side and dividing the drum into a settler and a converter, said gradually sloping face being provided with annular grooves, air inlet passages opening through said grooves, an air manifold encircling the second-mentioned drum and covering said passages, the joined ends of the second-mentioned drum and the final roasting drum being spaced to permit discharge of slag from the converter portion of the second-mentioned drum, said wall flange having passages extending therethrough longitudinally of the second-mentioned drum, and a burner in the refining drum arranged to direct the flame through the three connected drums.

6. An apparatus for the direct recovery of heavy metals of the nonferrous group from ores and other primary material, comprising a rotary shaft furnace, means for discharging a flame longitudinally through the furnace from one end, the other end of the furnace constituting an outlet, an ore receiver at said outlet, a rotary final roasting drum, a drum rotatably mounted adjacent one end of and receiving the end of the final roasting drum, a refining drum receiving in one end an end of the second-mentioned drum, the said final roasting drum receiving in its other end ore from said receiver, said second-mentioned drum having an interior wall flange presenting a steep face upon the side adjacent the final roasting drum and a gradually sloping face upon the opposite side and dividing the drum into a settler and a converter, said gradually sloping face being provided with annular grooves, air inlet passages opening through said grooves, an air manifold encircling the second-mentioned drum and covering said passages, the joined ends of the second-mentioned drum and the final roasting drum being spaced to permit discharge of slag from the converter portion of the second-mentioned drum, said wall flange having passages extending therethrough longitudinally of the second-mentioned drum, a burner in the refining drum arranged to direct the flame through the three connected drums, a gas and dust receiving chamber connected with the ore receiving end of the final roasting drum, a pipe of refractory material extending into the outlet end of said furnace, and means for withdrawing gas and dust from said chamber and discharging the same from said pipe into the rotary furnace.

7. In an apparatus of the character described, including a primary roasting furnace, a rotary shaft furnace system including three drums arranged coaxially and having their adjacent ends telescopically connected, said drums being adapted for independent rotation and constituting respectively a final roasting drum, a settler-converter drum and a refining drum, means for transferring ore directly from the outlet of the primary roasting furnace into the final roasting drum, the said settler converter drum having an interior annular wall dividing it into settler and converter chambers, said wall upon the settler chamber side being substantially straight and upon the converter chamber side being inclined and provided with annular recesses, an air manifold encircling the settler-converter drum and maintained stationary with respect to the same, said manifold covering air apertures leading through the drum and discharging into said annular passages, said wall having longitudinally extending openings inwardly of said annular passages, a burner arranged in the outer end of the refining drum to direct a flame longitudinally through said drums, and helical grooves formed in the wall of the settler converter-drum at the end adjacent the refining drum for transferring molten metal into the refining drum.

8. In a process for the direct recovery of heavy metals of the nonferrous group from ores and other primary materials which includes directing a roasting flame under pressure through a roasting chamber, the step which consists in projecting oxygen carrying gases with fine particles of ore suspended in a stream under a pressure in excess of the pressure of the roasting flame in opposition to the roasting flame to effect an inflation of said flame into a corona to form a hollow flame cone, the core particles in said flame being drawn off from the roasting chamber and projected back thereinto in said stream.

9. In a process for the direct recovery of heavy metals of the nonferrous group from ores and other primary materials which includes directing a roasting flame under pressure through a roasting chamber, the steps which consist in projecting oxidizing gas in a stream in opposition to and under a pressure in excess of that of the roasting flame to effect an inflation of said flame into a corona to form a hollow flame cone centrally of the roasting chamber, and withdrawing ore dust from the chamber and re-introducing it thereinto in said gas stream into said flame cone.

10. In apparatus for the direct recovery of heavy metals of the nonferrous group from ores and other primary materials, a horizontally disposed elongated continuously rotating roasting chamber of double cone form having its greatest diameter intermediate its ends, one of said ends being open, means for introducing ore material longitudinally in the chamber from the other end with a longitudinally directed roasting flame, the interior of said chamber having helical grooves formed in the wall thereof and extending to the said one end to effect feeding of material through said one end as the chamber rotates, final roasting, smelting and refining units arranged in the order stated for the movement of said material therethrough from the roasting chamber, means for transferring material from the said one end of the first chamber into the final roasting chamber, and means for directing a heating flame through said units from the refining unit in counterflow to the material moving through the units.

JULIUS LOHSE.